Feb. 1, 1949.　　T. L. FAWICK　　2,460,629
CUSHIONED PLANETARY GEARING
Filed March 19, 1945

INVENTOR.
THOMAS L. FAWICK
BY
Willard D. Eakin
Attorney

Patented Feb. 1, 1949

2,460,629

UNITED STATES PATENT OFFICE 2,460,629

CUSHIONED PLANETARY GEARING

Thomas L. Fawick, Akron, Ohio

Application March 19, 1945, Serial No. 583,533

6 Claims. (Cl. 74—305)

This invention relates to planetary gearing.

Its chief objects are to provide a gearing in which each of the several planets will sustain substantially the same amount of the torque in spite of inaccuracies in the forming of the gears and associated parts; to provide substantially uniform distribution of the load upon the gear teeth throughout their length; to reduce vibration and emission of sound; to compensate for unavoidable shaft-misalignment; and to provide for substantial but high modulus cushioning of the torque.

Figures 1, 2, 3, 4:
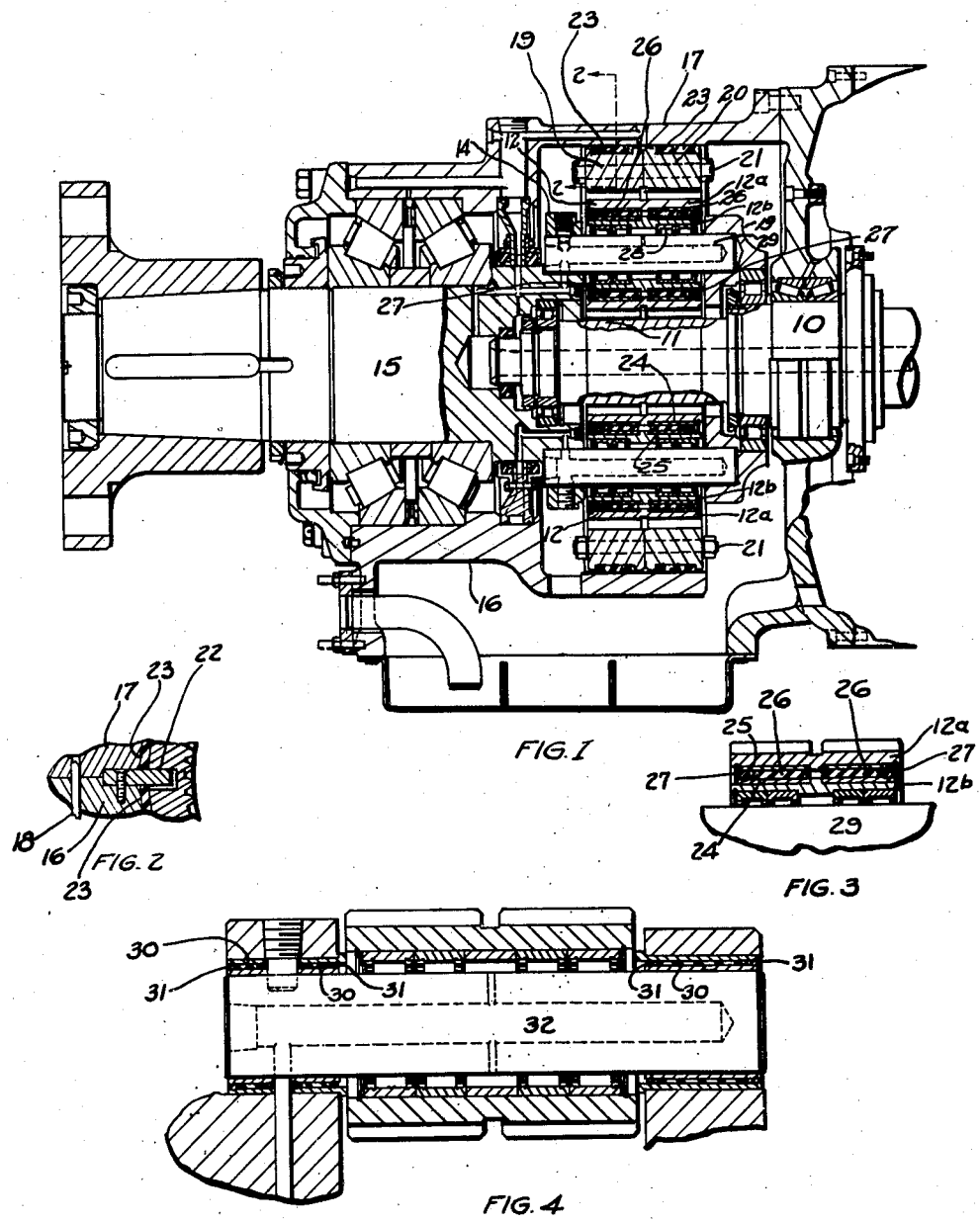
Fig. 1 is a vertical, axial section of a planetary reduction-gear assembly embodying my invention in its preferred form.
Fig. 2 is a fragmentary section on line 2—2 of Fig. 1.
Fig. 3 is a fragmentary section of parts as seen in Fig. 1 but on a larger scale.
Fig. 4 is an axial section of a planet gear, parts of its mounting also being shown in section, illustrating a modification.

Referring to the drawings, the embodiment shown in Figs. 1, 2 and 3 comprises a drive shaft 10 having a sun gear 11 fixed thereon, a set of planet gears 12, 12 mounted in a two-part cage or spider 13, 14, of which the part 14 is integral with a driven shaft 15.

The shafts 10 and 15 are journaled, with suitable bearings as shown, in a housing which comprises a lower half-circle section 16 and an upper half-circle section 17 held together by bolts such as the bolt 18, Fig. 2.

The fulcrum gear, internally toothed, is made i two annular, axially separable sections 19, 20, which permits the gears to be of the herringbone type. The two rings are held together by bolts such as the bolts 21, 21 and are held against rotation by diametrically opposite keys, such as the key 22, Fig. 2, mounted in suitable recesses formed in the housing sections 16, 17 at their parting plane.

Each of the fulcrum gear rings 19, 20 is of slightly less outer diameter than the adjacent cylindrical inner face of the housing and preferably they have, for the keys 22, notches of such size that the keys fit in them somewhat loosely, so that the fulcrum-gear rings can drift slightly in any direction for self-alignment with the planet gears and to compensate for any unavoidable eccentricity in the assembly. Such drifting is yieldingly resisted however, and noise-producing metal impacts avoided, by rubber half-rings 23, 23, set in grooves formed in the outer races of the gear rings 19, 20, with their backs pressing against the inner face of the housing and their ends abutting the keys 22, the rubber members being mounted under substantial radial compression. Preferably they are longitudinally grooved on their outer faces, as shown, to give them a high degree of deformability.

Each of the planet gears has mounted therein, between its toothed outer portion 12a and its hub portion, 12b, a composite bushing comprising inner and outer metal shells 24, 25 and, held under radial compression between them, cushioning bodies of rubber 26, 26 and, at each end of the bushing, a sealing ring 27 of a resilient, oil-resistant material such as the rubber-like synthetic material, chlor-butadiene. Polymerized vinyl chloride or copolymers of vinyl chloride and vinyl acetate also are suitable for these oil-sealing members, which permit the use of a rubber such as tire-tread stock for the cushioning bodies 26 in spite of its being subject to deterioration when oil is permitted to contact it.

Mounted in the hub portion 12b of each planet gear, with the roller cages interlocked against relative axial movement therein, is a roller bearing 28 the rollers of which bear directly against the planet's axle pin 29, and as the planet assembly is a little shorter axially than the space provided for it in the planet cage, the planets can drift axially for self-alignment under the driving force of the herringbone teeth of the sun gear 11, the fulcrum gear 19, 20 also automatically aligning itself under the force of the herringbone teeth of the planets.

The several rubber bodies provide a sound-deadening effect and cushion the movements of the parts and permit the load to be distributed with substantial uniformity on the teeth and the rubber cushion bodies 26 in the planets, sustaining the torque in radial compression, yield without great resistance to such extent as to compensate for inaccuracy of construction and yet, having a high modulus of resilience, they sustain approximately equal amounts of torque when the gearing is under substantial torque load.

In the modification illustrated in Fig. 4 rubber cushions 30, 30 and oil-sealing rings 31, 31 are mounted between each planet-axle pin 32 and its supports, instead of in the planet.

The construction as described is such that the cushions permit the planets to adjust themselves with relation to the sun gear and the cushion surrounding the fulcrum gear permits it, in turn, to adjust itself with relation to the planets, so that, the two cushioning elements of the assembly being in series, in alternation with the three gear elements, each of the three gear elements has cushioned centering in relation to the other two. Also, in the case of herringbone gears, each has automatic cushioned alignment in relation to each of the other two.

Further modifications are possible within the scope of the invention as defined by the appended claims.

I claim:

1. A planetary gearing comprising a set of planet gears, two gears entrained with each other through said planet gears, a mounting for said planet gears, and, interposed between the planet gears respectively and their mounting, all-direction-cushioning means individual to the planet gears and comprising material having substantially the resilient deformability of vulcanized soft-rubber, each planet gear being isolated from said mounting by the said material and having, with respect to all rigid parts of the assembly, clearances such as to permit universal cushioned movement of each of the planet gears in relation to their said mounting.

2. A planetary gearing comprising a set of planet gears, two gears entrained with each other through said planet gears, a mounting for said planet gears, and, interposed between the planet gears respectively and their mounting, all-direction-cushioning means individual to the planet gears and comprising natural rubber and, in protective relation thereto, an oil-resisting synthetic material having substantially the resilient deformability of vulcanized soft-rubber, each planet gear being isolated from the said mounting by the said material and being free for universal cushioned movement in relation to the mounting.

3. A planetary gearing comprising a set of planet gears, two gears entrained with each other through said planet gears, a mounting for said planet gears, and, interposed between the planet gears respectively and their mounting, all-direction-cushioning means individual to the planet gears and comprising material having substantially the resilient deformability of vulcanized soft-rubber, each planet gear being isolated from the said mounting by the said material and being free for universal cushioned movement in relation to the mounting; the gears being of the herringbone type and the planet gears having freedom of axial movement additional to that provided by the cushioning material, by reason of the cushioning material being mounted upon a hub member and the hub member being slidably mounted upon the gear's axle with axial clearance permitting relative axial movement of the hub member upon the axle.

4. A planetary gearing comprising a sun gear, a planet gear and a fulcrum gear, a mounting for each of said gears, and, interposed between each of at least two of said gears and its mounting respective radially-cushioning means in series as to cushioned centering of each of the three gears in relation to the other two, and means comprising a material having substantially the resilient deformability of vulcanized soft-rubber, all of the recited gears having, with respect to all rigid parts of the assembly, clearances such as to permit said cushioned centering.

5. The combination of three entrained gears of the herringbone type, a mounting for each of said gears, and, between each of at least two of said gears and its mounting, respective cushioning means permitting axial cushioned movement of the gear on its mounting, each of the said cushioning means comprising cushioning material having substantially the resilient deformability of vulcanized soft-rubber and the two cushioning means being in series for cushioned relative axial positioning of each of the three gears with relation to the other two.

6. A gear assembly comprising an internally toothed ring, a mounting surrounding the same in spaced relation to it to define an annular cushion-accommodating space and to permit radial relative movement of the ring, and cushioning material having substantially the resilient deformability of vulcanized soft-rubber mounted between the two for cushioning such radial movement, the ring having freedom for axial movement in relation to the mounting but being interlocked therewith against extensive relative circumferential movement.

THOMAS L. FAWICK.

REFERENCES CITED

The following references are of record in the file of this patent:

UNITED STATES PATENTS

| Number | Name | Date |
|---|---|---|
| 1,127,312 | Sundh | Feb. 2, 1915 |
| 1,134,772 | Sundh | Apr. 6, 1915 |
| 1,228,145 | Sundh | May 29, 1917 |
| 1,424,203 | Keller | Aug. 1, 1922 |
| 1,425,430 | Wikander | Aug. 8, 1922 |
| 1,586,309 | Hult | May 25, 1926 |
| 1,775,926 | Barbarou | Sept. 16, 1930 |
| 1,785,812 | Gribben | Dec. 23, 1930 |
| 1,928,763 | Rosenberg | Oct. 3, 1933 |
| 1,946,956 | Waseige | Feb. 13, 1934 |
| 2,043,261 | Nevland | June 9, 1936 |
| 2,307,129 | Hines | Jan. 5, 1943 |

FOREIGN PATENTS

| Number | Country | Date |
|---|---|---|
| 298,471 | Great Britain | May 23, 1929 |